United States Patent [19]

Powers

[11] Patent Number: 4,568,965

[45] Date of Patent: Feb. 4, 1986

[54] FOUR-SAMPLE SAMPLE-RATE CONVERTER

[75] Inventor: Kerns H. Powers, Princeton, N.J.

[73] Assignee: RCA Corporation, Princeton, N.J.

[21] Appl. No.: 484,527

[22] Filed: Apr. 13, 1983

[51] Int. Cl.[4] ............................................. H04N 11/20
[52] U.S. Cl. ...................................... 358/11; 358/140
[58] Field of Search ................... 358/11, 13, 140, 141, 358/313; 375/14, 27

[56] References Cited

U.S. PATENT DOCUMENTS

| | | | |
|---|---|---|---|
| 4,016,410 | 4/1977 | Eggermont | 375/14 |
| 4,106,053 | 8/1978 | Maxemchuk | 358/13 |
| 4,280,147 | 7/1981 | Baldwin | 360/10 |
| 4,352,122 | 9/1982 | Reitmeier | 358/13 |
| 4,400,719 | 8/1983 | Powers | 358/11 |
| 4,438,452 | 3/1984 | Powers | 358/11 |

*Primary Examiner*—Tommy P. Chin
*Attorney, Agent, or Firm*—J. E. Roehling; W. M. Meise; E. M. Whitacre

[57] ABSTRACT

A transcoding arrangement transcodes television signals sampled at a first clock rate into second signals sampled at a second clock rate. An integer number of samples of the television signals are assembled into blocks, each block containing an integer number of samples of the second signal. The integers are selected to reduce the number of multipliers required to perform the transcoding. A delay element forms four successive delayed samples of the incoming television signal. The first and last delayed samples are summed and then multiplied by a running variable multiplicand to form a weighted sum signal. The second and third delayed samples are multiplied by respective running variable multiplicands to form second and third weighted delayed samples. The weighted second and third samples are summed to form a sum which is subtracted from the weighted sum signal to form the interpolated output sample. The running variable multiplicands are related to the effective position of the interpolated output sample being formed within a transcoding block of samples.

5 Claims, 5 Drawing Figures

Fig. 2

| n | n' | $a_n$ | $b_n$ | $c_n$ |
|---|----|-------|-------|-------|
| 0 | 0 | 1 | 0 | 0 |
| 1 | 2 | 1054/1089 | 97/1089 | 31/1089 |
| 2 | 4 | 1015/1089 | 190/1089 | 58/1089 |
| 3 | 6 | 972/1089 | 279/1089 | 81/1089 |
| 4 | 8 | 925/1089 | 364/1089 | 100/1089 |
| 5 | 10 | 874/1089 | 445/1089 | 115/1089 |
| 6 | 12 | 819/1089 | 522/1089 | 126/1089 |
| 7 | 14 | 760/1089 | 595/1089 | 133/1089 |
| 8 | 16 | 697/1089 | 664/1089 | 136/1089 |
| 9 | 18 | 630/1089 | 729/1089 | 135/1089 |
| 10 | 20 | 559/1089 | 790/1089 | 130/1089 |
| 11 | 22 | 484/1089 | 847/1089 | 121/1089 |
| 12 | 24 | 405/1089 | 900/1089 | 108/1089 |
| 13 | 26 | 322/1089 | 949/1089 | 91/1089 |
| 14 | 28 | 235/1089 | 994/1089 | 70/1089 |
| 15 | 30 | 144/1089 | 1035/1089 | 45/1089 |
| 16 | 32 | 49/1089 | 1072/1089 | 16/1089 |
| 17 | 1 | 1072/1089 | 49/1089 | 16/1089 |
| 18 | 3 | 1035/1089 | 144/1089 | 45/1089 |
| 19 | 5 | 994/1089 | 235/1089 | 70/1089 |
| 20 | 7 | 949/1089 | 322/1089 | 91/1089 |
| 21 | 9 | 900/1089 | 405/1089 | 108/1089 |
| 22 | 11 | 847/1089 | 484/1089 | 121/1089 |
| 23 | 13 | 790/1089 | 559/1089 | 130/1089 |
| 24 | 15 | 729/1089 | 630/1089 | 135/1089 |
| 25 | 17 | 664/1089 | 697/1089 | 136/1089 |
| 26 | 19 | 595/1089 | 760/1089 | 133/1089 |
| 27 | 21 | 522/1089 | 819/1089 | 126/1089 |
| 28 | 23 | 445/1089 | 874/1089 | 115/1089 |
| 29 | 25 | 364/1089 | 925/1089 | 100/1089 |
| 30 | 27 | 279/1089 | 972/1089 | 81/1089 |
| 31 | 29 | 190/1089 | 1015/1089 | 58/1089 |
| 32 | 31 | 97/1089 | 1054/1089 | 31/1089 |
| 33 | 33 | 0 | 1 | 0 |

Fig. 4

FOUR-SAMPLE SAMPLE-RATE CONVERTER

This invention relates to digital television transcoding and, more particularly, to arrangements for sample-rate conversion between disparate sample rates of different television standards.

BACKGROUND OF THE INVENTION

U.S. patent application Ser. No. 230,384 filed on Feb. 2, 1981, in the name of K. H. Powers (now abandoned), continuation-in-part application Ser. No. 262,619 filed on May 11, 1981, (also now abandoned), continuation application Ser. No. 411,907, filed on Aug. 26, 1982, with divisional applications Ser. Nos. 411,905 and 411,906 describe linear, square-law and cubic interpolators for transcoding from television signals sampled at a first clock rate to television signals sampled at a second clock rate. These applications will be referred to hereinafter as the Powers cases. In these applications, transcoding methods and corresponding transcoders were described which utilize 2, 3 or 4 successive samples of the source signal. These applications describe simplified implementations for those transcodings in which the ratio of the clock frequencies of the two signals, i.e., $F_1/F_2$ is equal to a fraction $M/2^r$, where M and r are arbitrary integers. The described simplification lies in that the multiplications of the algorithm can be implemented in logic by shift registers and adders. For television signals, these applications describe the approximation of the ratio $F_1/F_2$ by $M/2^r$ where M and r are relatively small integers. For the case of transcoding a video signal sampled at four times the NTSC standard subcarrier frequency (i.e., 4×SC) to a signal sampled at the CCIR world-standard digital rate of 13.5 MHz, for example, the ratio is:

$$\frac{F_1}{F_2} = \frac{14.318}{13.500} = \frac{910}{858} = \frac{35}{33} \approx \frac{17}{16} \quad (1)$$

and, similarly, for the equivalent transcoding of a standard PAL signal to the 13.5 MHz standard, the corresponding ratio is:

$$\frac{F_1}{F_2} = \frac{17.734}{13.500} \approx \frac{1135}{864} \approx \frac{21}{16} \quad (2)$$

It should be noted that both approximated ratios, equations 1 and 2, have the desired form $M/2^r$, where M is either 17 (equation 1) or 21 (equation 2) and r is equal to 4.

These simplifying approximations in transcoding result in a small geometric picture distortion. For the examples given, transcoding from NTSC produces a 0.18% picture stretch and that from the PAL signal produces a 0.16% skew and 0.09% stretch. These distortions are well within the tolerance limits of camera and kinescope adjustments, and may be ignored except for those cases in which cascades of transcodings having similar distortions are encountered.

It is desirable to have alternative configurations that require a reduced number of multipliers, and to use other approximation techniques for achieving simple configurations without picture distortion.

SUMMARY OF THE INVENTION

A transcoding arrangement transcodes signals sampled at a first frequency into second signals sampled at a second frequency. The value of each sample of the second signal is interpolated from four samples of the first signal. A clock signal generator coupled to the source of the first signal generates a clock signal at the second given sample frequency. Respective first, second, third and fourth time successive samples of the first signal are provided via a delay means coupled to the source of the first signals. An adder coupled to the delay means sums the first and fourth samples to form a first sum signal. Three multipliers are used to form weighted values of the samples of incoming signal. The first multiplier which is coupled to the summing means multiplies the first sum signal by a first coefficient to provide a weighted first sum signal. The second multiplier which is coupled to the delay means multiplies the second sample by a second coefficient to provide a weighted second sample. The third multiplier multiplies the third sample by a third coefficient to provide a weighted third sample. The third multiplier is also coupled to the delay means. A combining means which is coupled to the first, second and third multipliers combines the weighted first sum signal, the weighted second sample and the weighted third sample to form a sample of the second signal having an interpolated amplitude.

BRIEF DESCRIPTION OF THE DRAWINGS

In the drawing:

FIG. 2 is a timing diagram useful in understanding the relative sampling times when transcoding from one signal sampled at a first rate to another signal sampled at a second rate;

FIG. 4 is a table of coefficients for interpolating new sample points in accordance with the interpolator of FIG. 3.

DETAILED DESCRIPTION OF THE PREFERRED EMBODIMENTS

As discussed above in the Powers cases means were disclosed to achieve linear and square-law transcoding from a first digital television signal sampled at a first clock frequency (i.e., $F_1$) to a second signal sampled at a second clock frequency (i.e., $F_2$). As shown above in equation (1) the ratio of $F_1$ to $F_2$ for transcoding NTSC to the world-wide digital standard reduces to a fraction, i.e., 35/33. In accordance with the present invention an alternative configuration to the sample rate converter of the Powers cases is provided. In this configuration only three multipliers are required to implement the sample rate converter. This simple implementation may be achieved without penalty of picture distortion.

Assuming a clock frequency ratio:

$$\frac{F_1}{F_2} = \frac{35}{33} \quad (3)$$

a block of 35 samples at a first rate ($F_1$) occupies the same time duration as a block of 33 samples at the second rate ($F_2$). By selecting the total number of samples so that they may be divided into relatively small blocks, the amount of signal processing necessary for transcoding may be much reduced. If the source digital signals are sampled at the $F_1$ rate it will be apparent that to generate a signal sampled at the $F_2$ rate some interpolation will be required for all second signal samples except those at the endpoints of the block.

Figure 1:
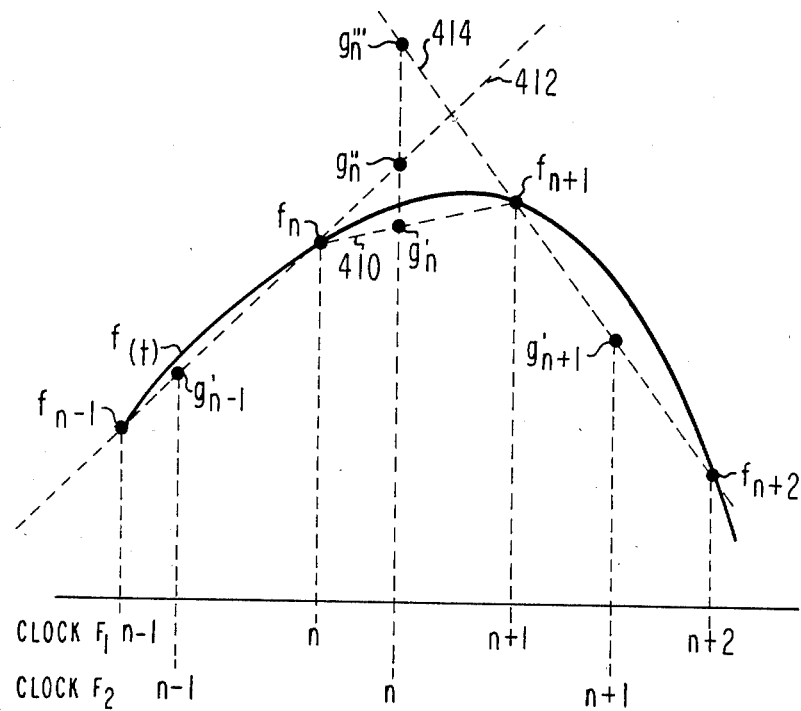
FIG. 1 illustrates a generalized waveform aiding in understanding the interpolation of new sample points by the square-law techniques described in accordance with the present invention.

Referring to FIG. 1 the waveform f(t) represents a sequence of samples $f_{n-1}$, $f_n$, $f_{n+1}$, $f_{n+2}$. The straight lines 410, 412, 414 connecting successive sample values (i.e., $f_{n+1}$ and $f_n$, $f_n$ and $f_{n-1}$, $f_{n+2}$ and $f_{n+1}$, respectively) represent linear approximations to the analog waveform f(t), and the samples marked $g_n$ represent interpolated samples at the clock rate of 13.5 MHz ($F_2$) that occur in the interval between the immediately preceding sample $f_n$ and the following sample $f_{n+1}$. Generally speaking, the value $g_n'$ of the $n^{th}$ linear interpolated output sample may be determined by $$g_n' = f_n + \frac{n'}{33}(f_{n+1} - f_n) \quad (4)$$

where n' may range from 0 to 32 and represents the fractional position in the interval of the interpolated sample $g_n$. The operation defined by equation (4) consists of two additions and one multiplication.

Figure 2:
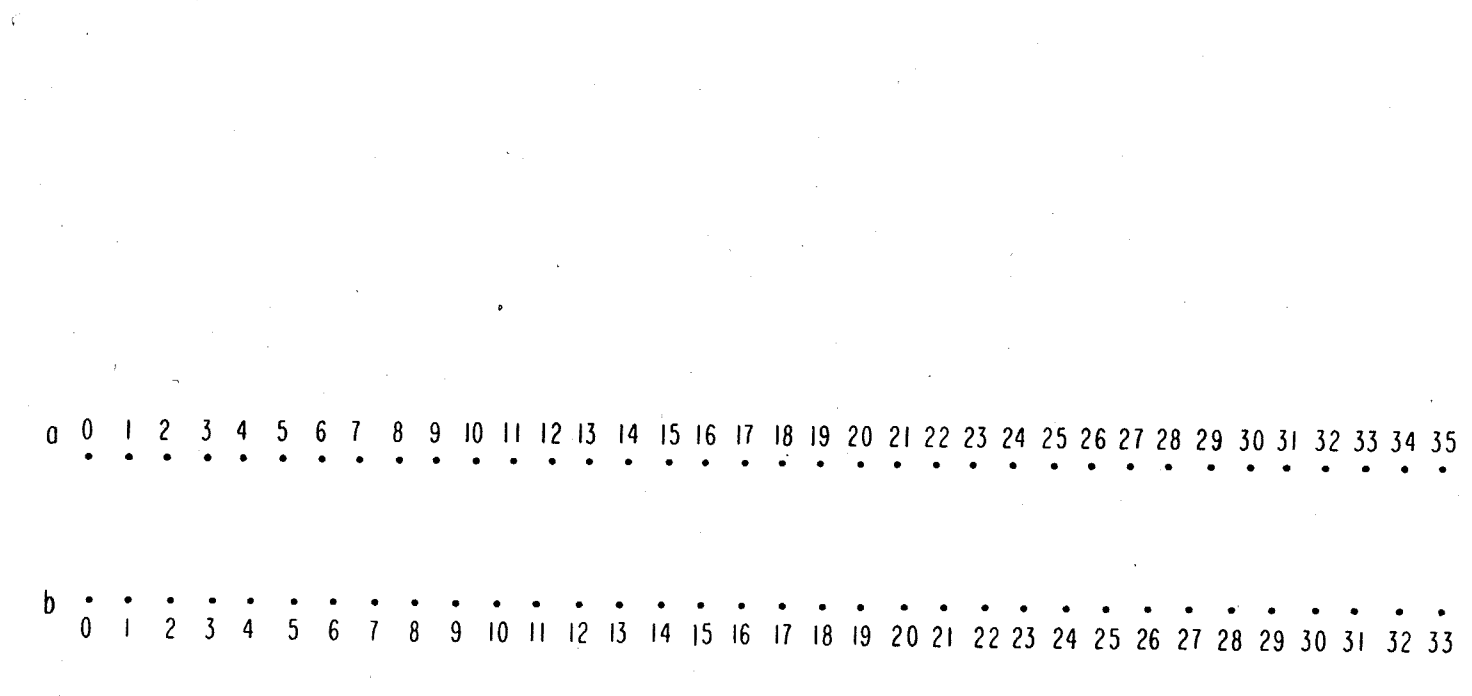

Referring to FIG. 2, a set of points representative of the position in time of samples at the two different sample rates $F_1$ and $F_2$ is shown. The horizontal axis represents time. The length of line a is 35 units long with each mark representing a sample time at the rate $F_1$. Samples 0 to 34 correspond to one block of data in an incoming television signal which occurs sequentially in a television transmission and the 35th sample is the first sample of the next block. The block of samples in line b is representative of samples of an output signal at a different rate, e.g., at $F_2$. Line b is 33 units long. The first 33 samples are representative of a block of samples at the $F_2$ rate which block corresponds in time with a block of samples at the $F_1$ rate. Sample 33 of line b which is the first sample of the next block, corresponds in time with sample 35 of line a. It will be apparent that to generate a signal according to the clocking system of line b some interpolation will be required. For example, sample 0 of line a coincides with sample 0 of line b, no b sample lies between the 0 and 1 samples of line a, sample 1 of b lies between samples 1 and 2 of a, sample 2 between 2 and 3 and so on up to sample 17 of b. Sample 17 of b is nearly coincident with sample 18 of a. Then sample 18 of b is between samples 19 and 20 of a, sample 19 of b is between samples 20 and 21 and so on until sample 32 of b which is between samples 33 and 34 of a.

Interpolation by the linear approximation technique of equation (4) may create severe errors in the interpolation process. The error in the value of $g_n'$ is equivalent to the difference between the value of the curving waveform f(t) at the time n of the sample point $g_n'$ and the value of the point $g_n'$ on the straight line 410 between $f_{n+1}$ and $f_n$. This error can be small, especially when the interpolated result is quantized to the same number of levels as the input waveform. The errors tend to be largest at points of maximum concavity in the incoming waveform and are in the direction toward the inside of the concavity as shown in FIG. 1. Such errors do not occur in flat (constant level) regions of the picture or in linearly changing regions but occur only in the vicinity of changing slope (concave up or concave down). Thus interpolation errors will occur only in regions of high definition or rapidly changing edges. The subjective effect of the error is to reduce the concavity, or to soften the picture edges. The interpolation error resulting from concavities in the waveform f(t) from which the original sample values $f_n$ are derived can be significantly reduced by using information drawn from more of the surrounding points as by using four sample points instead of two. This is accomplished by using the extensions 412 and 414 of the straight line approximations formed between sample points $f_n$ and $f_{n-1}$ and between $f_{n+1}$ and $f_{n+2}$, respectively. Realizing that the time of occurrence n of new samples $g_n'$, at the $F_2$ clock rate can occur very near the time of sample $f_n$ it will be apparent that the weight to be given to approximations $g_n''$ on straight line 412 or $g_n'''$ on straight line 414 in determining the actual value $g_n$ of the new sample at the time n will depend upon the proximity in time of sample $g_n$ to either the sample $f_n$ or $f_{n+1}$.

To compute the interpolated $g_n$, the value of $g_n''$ is chosen as being equal to the value of the incoming sample $f_n$ plus an incremental portion of the difference between samples $f_n$ and $f_{n-1}$, thus $$g_n'' = f_n + \frac{n'}{33}(f_n - f_{n-1}) \quad (5)$$

Similarly, the value of $g_n'''$ on the extension of straight line 414 is determined by adding to the known value of $f_{n+1}$ the difference in sample values between $f_{n+1}$ and $f_{n+2}$ multiplied by 1 minus the incremental portion used to determine $g_n''$, and therefore $$g_n''' = f_{n+1} + \frac{33 - n'}{33}(f_{n+1} - f_{n+2}). \quad (6)$$

It should be noted that n' according to equations 4, 5 and 6 may be selected by using the following equation $$n' = n \times (35 - 33) \text{modulo } 33, \quad (7)$$

where n represents the count on the output samples.

It is apparent that the value of the new sample $g_n$ is determined by the weights given to $g_n'$; $g_n''$; $g_n'''$. Depending upon the value of the weighting constant choosen for each of the $g_n$"s the concavity of the interpolated function will increase or decrease. Thus the weighting of the interpolated values may be made in the square-law interpolation so that rapid changes are exaggerated, i.e., the transitions or edges in the television picture are enhanced or crispened.

In accordance with one aspect of the invention the crispening factor (i.e., weighting) for the square-law interpolated sample $g_n$ may be choosen to be $\frac{1}{2}$ and thus $g_n$ becomes $$g_n = \tfrac{1}{2}g_n' + \tfrac{1}{2}\left(\frac{33 - n'}{33}g_n'' + \frac{n'}{33}g_n'''\right) \quad (8)$$

As will be noticed in equation (8) the $g_n''$ and $g_n'''$ values are weighted so that their coefficients will sum to one. Thus, in accordance with equation (8) $g_n$ is equal to the sum of $\frac{1}{2}$ of the $g_n'$ interpolated sample plus $\frac{1}{2}$ of the weighted $g_n''$ and $g_n'''$ samples. Equation (8) may be expressed in terms of the f(t) samples, i.e., $f_{n-1}$, $f_n$, $f_{n+1}$ and $f_{n+2}$, by substituting equations 4, 5 and 6 into equation 8. $g_n$ becomes $$g_n = -\left(\frac{n'(33-n')}{2 \times 33^2}\right) f_{n-1} + \tag{9}$$

$$\left(\frac{2 \times 33^2 - 33n' - n'^2}{2 \times 33^2}\right) f_n + \left(\frac{99n' - n'^2}{2 \times 33^2}\right) f_{n+1} +$$

$$\left(-\frac{n'(33-n')}{2 \times 33^2}\right) f_{n+2}$$

From an inspection of equation (9) it can be seen that the coefficients of $f_{n-1}$ and $f_{n+2}$ are equal; thus, the samples $f_{n-1}$ and $f_{n+2}$ may be added together before multiplication by the coefficient, saving one multiplier.

Figure 3:
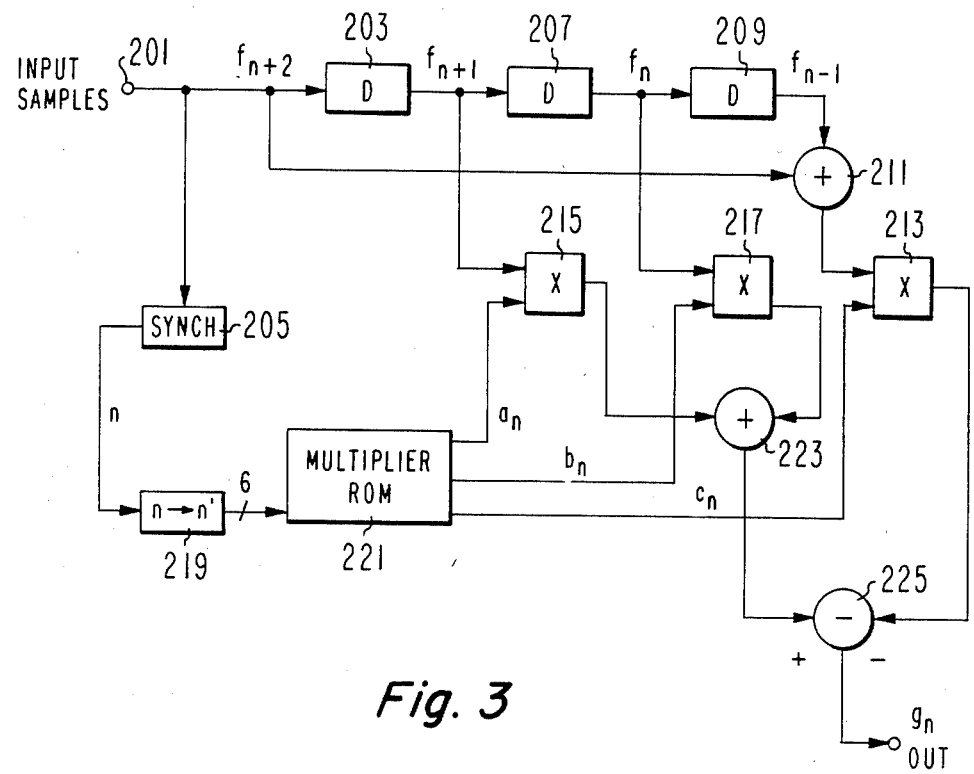
FIG. 3 is a block diagram of an interpolator in accordance with one aspect of the present invention.

Referring to FIG. 3 a block diagram of a circuit for implementing equation (9) is shown. The interpolator of FIG. 3 is advantageously implemented using only three multipliers, whereas, for example, the interpolator of FIG. 14 embodiment of the Powers cases which is implemented using four multipliers.

In FIG. 3, an input signal is applied by way of input terminal 201 to the input of a delay element 203 and a sync or timing circuit 205. The sync generator 205 derives the output clock rate and contains a counter to count the output clock to obtain the current count (n) in each block of 33 output samples. Delay element 203 delays the signal by a known amount to produce a delayed signal $f_{n+1}$ which defines the input signal as $f_{n+2}$. Delayed signal $f_{n+1}$ is applied to further delay elements 207 and 209 to produce further delayed signals $f_n$ and $f_{n-1}$, respectively. Signals $f_{n-1}$ and $f_{n+2}$ are applied to adder 211 to be summed before multiplication by a weighting coefficient. The output from adder 211 and signals $f_{n+1}$ and $f_n$ are applied to multipliers 213, 215 and 217, respectively. The output from sync generator 205 is a signal n obtained from the count on the output clock identifying the position of the sample to be interpolated in each block of 33. In accordance with equation (7) generator 219 generates the n' based on the input n. The output from generator 219 may be a parallel output used to address the multiplier ROM 221. A lookup table in ROM 221 provides coefficients $a_n$, $b_n$ and $c_n$ in accordance with FIG. 4. In FIG. 4 the coefficients $a_n$, $b_n$ and $c_n$ correspond to the coefficients of $f_n$, $f_{n+1}$ and $f_{n+2}+f_{n-1}$ of equation (9), respectively. These coefficients are tabulated in FIG. 4 for each value of n'. The outputs from multipliers 215 and 217 are summed in adder 223 and the output from multiplier 213 and adder 223 are differenced in subtractor 225. The output from subtractor 225 is the interpolated value $g_n$.

From an inspection of FIG. 4 it will be seen that the $a_n$ coefficients start at 1 for sample 0, decrease to 49/1089 at sample 16, go to 1072/1089 at sample 17 and decrease to 97/1089 at sample 32. On the other hand, the $b_n$ coefficients start at 0 for sample 0, increase to 1072/1089 at sample 16, go to 49/1089 for sample 17 and then increase to 1054/1089 at sample 32. At sample 33 which is the first sample of the next block of data then $a_n$ and $b_n$ have been interchanged. The interchange reflects the fact that at the end of a block of samples the new $g_n$ interpolated value will reside between the old $f_{n+1}$ and $f_{n+2}$ samples instead of being between the $f_n$ and $f_{n+1}$ samples. The delay lines 203, 207 and 209 of FIG. 3 are FIFO type buffers so that the hardware will compensate for this sample point variation from block to block. As stated above, it should be understood that the $f_n$'s are chosen based on the output samples $g_n$'s, i.e., n represent the count on the output samples.

The coefficients of FIG. 4 expressed to four significant (decimal) figures would require an accuracy of greater than 10 bits for the multiplier inputs to compute the $g_n$ samples with full accuracy. However, as the output samples will be rounded off to 8 bits after transcoding, the interpolation error would not be significantly impaired ($\pm$ one quantum error) if the coefficients were rounded to 8 bit accuracy in the lookup ROM. This rounding can be done for each coefficient in FIG. 4 by multiplying the coefficient by 256 and rounding to the nearest integer. For example, the 8-bit rounded coefficient $a_n$ for n equals 10 is obtained by $$256 \times \frac{559}{1089} = 131.4 \tag{10}$$

Thus, the 8-bit rounded coefficient becomes 131/256. Similarly, $b_{10}$ equals approximately 186/256.

Figure 5:
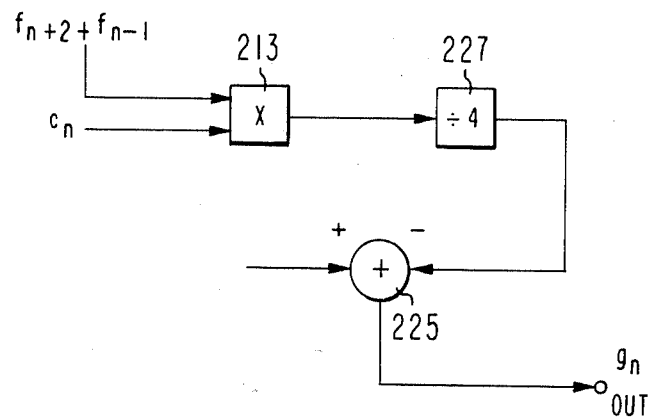
FIG. 5 shows a portion of the FIG. 3 interpolator modified to use coefficients which have been rounded-off in accordance with one aspect of the present invention.

Referring to FIG. 5 an arrangement is shown where the $c_n$'s can be rounded more accurately by multiplying by 1024 and rounding. In accordance with the arrangement of FIG. 5 the output from multiplier 213 is divided by 4 in divider 227. In accordance with this implementation divider 227 may be implemented with a shift register where the output is shifted by two places. According to the arrangement of FIG. 5 the $c_n$'s would be rounded to 1024 by multiplying by 1024 and rounding. In accordance with this example, $c_{10}$ would equal:

$$c_{10} \approx \frac{122}{256} \times \frac{1}{4} \tag{11}$$

While the embodiments described apply to square-law interpolation techniques it should be apparent to those skilled in the art that these table-look-up coefficient rounding methods may be applied to other polynomial approximations as described in the aforementioned Powers cases. Thus, for the 35/33 transcoding case a cubic interpolation may be used by weighting two parabolas and adding them together to obtain a cubic polynomial that passes through the four sample points $(f_{n-1}, f_n, f_{n+1}, f_{n+2})$.

What is claimed is:

1. A transcoder for transcoding a first television signal sampled at a first given frequency into a second signal sampled at a second given frequency by interpolating a value of said second signal from four samples of said first signal, comprising:

a clock signal generator coupled to the source of said first signal for generating a clock signal;

delay means coupled to said source of said first signal for providing respective first, second, third and fourth time successive samples of said first signal;

summing means coupled to said delay means for summing said first and fourth samples to form a first sum signal;

first multiplying means coupled to said summing means for multiplying said first sum signal by a first running variable coefficient to provide a weighted first sum signal;

second multiplying means coupled to said delay means for multiplying said second sample by a second running variable coefficient to provide a weighted second sample;

third multiplying means coupled to said delay means for multiplying said third sample by a third running variable coefficient to provide a weighted third sample;

running variable coefficient generating means coupled to said clock signal generator and to said first, second and third multiplying means for generating said first, second and third running variable coefficients in accordance with the time position of each sample being interpolated responsive to said clock signal; and combining means coupled to said first, second and third multiplying means for combining said weighted first sum signal, said weighted second sample and said weighted third sample to form a sample of said second signal having an interpolated amplitude.

2. The transcoder according to claim 1 wherein said running variable coefficient generating means comprises a read-only memory.

3. The transcoder according to claim 2 wherein said combining means, comprises:

second summing means coupled to said second and third multiplying means for summing said weighted second and third samples; and differencing means coupled to said first multiplying means and said second summing means for forming a difference signal representing the difference between said weighted second and third samples and said weighted first sum signal, said difference signal representing said interpolated sample of said second signal.

4. The transcoder according to claim 3 wherein said clock signal generator generates a clock signal at said second given frequency.

5. A method for generating an interpolated output signal sampled at a given frequency from an input signal sampled at a different frequency, comprising for each sample of the output signal:

generating first, second and third coefficients in accordance with the time position of the sample being interpolated;

delaying said input signal to produce four successive samples $f_{n-1}$, $f_n$, $f_{n+1}$ and $f_{n+2}$;

adding together the $f_{n-1}$ and the $f_{n+2}$ samples to form a first summed signal sample;

multiplying said $f_{n+1}$ and $f_n$ signal samples, respectively, by said first and second coefficients, respectively, to form first and second product signals;

multiplying said first summed signal sampels by said third coefficient to form a third product signal;

adding together said first and second product signals to form a second summed signal; and taking the difference between said second summed signals and said third product signals to form said interpolated output signal.

* * * * *